United States Patent
Gotterbauer et al.

(10) Patent No.: US 6,419,869 B1
(45) Date of Patent: Jul. 16, 2002

(54) METHOD OF PRODUCING HIGH-GRADE PLASTIC PARTS AND AN INJECTION-MOULDED PART

(75) Inventors: Klaus Gotterbauer, Vilsheim; Stefan Könsgen, Landshut, both of (DE)

(73) Assignee: Eldra Kunststofftechnik GmbH, Geisenhausen (DE)

(*) Notice: Subject to any disclaimer, the term of this patent is extended or adjusted under 35 U.S.C. 154(b) by 0 days.

(21) Appl. No.: 09/196,632

(22) Filed: Nov. 20, 1998

Related U.S. Application Data

(63) Continuation of application No. PCT/EP97/02581, filed on May 21, 1997.

(30) Foreign Application Priority Data

May 22, 1996 (DE) .......................................... 196 20 646

(51) Int. Cl.$^7$ .............................................. B29C 45/16
(52) U.S. Cl. ........................ 264/255; 264/259; 264/260; 264/271.1; 264/279; 264/279.1; 264/328.8; 264/328.17; 425/130
(58) Field of Search .................................. 264/255, 259, 264/260, 271.1, 279, 328.8, 279.1, 134, 135, 328.17; 425/130; 427/258, 402, 407.1

(56) References Cited

U.S. PATENT DOCUMENTS

| | | | |
|---|---|---|---|
| 3,991,146 A | | 11/1976 | Barrie |
| 4,927,590 A | * | 5/1990 | Poelzing ................. 264/272.17 |
| 4,944,909 A | * | 7/1990 | Eckardt et al. ............... 264/255 |
| 4,978,493 A | * | 12/1990 | Kersemakers et al. ....... 264/255 |
| 5,443,378 A | * | 8/1995 | Jaroschek et al. ........... 425/130 |
| 5,665,164 A | * | 9/1997 | Milliman ..................... 118/420 |
| 6,136,249 A | * | 10/2000 | Takeuchi et al. ............. 264/255 |

FOREIGN PATENT DOCUMENTS

| | | | |
|---|---|---|---|
| DE | 2 353 816 | | 5/1974 |
| DE | 80 34 352 | | 6/1982 |
| EP | 0 419 911 | | 4/1991 |
| GB | 1156217 | | 6/1969 |
| GB | 1 420 948 | | 1/1976 |
| GB | 1420948 | * | 1/1976 |

OTHER PUBLICATIONS

Peter Breuer, Lecture "Multi–Component Injection Moulding Method", Arburg GmbH, pp. 22–24, Oct. 1, 1997.

* cited by examiner

*Primary Examiner*—Suzanne E. McDowell
(74) *Attorney, Agent, or Firm*—Finnegan, Henderson, Farabow, Garrett & Dunner, L.L.P.

(57) ABSTRACT

A method of producing an injection molded part in which an insert is disposed within a mold cavity and extrusion coated with a plastic material fed via injection cylinder by layering at least one hard component and at least one soft component of a plastic material within the injection cylinder and then successively feeding the hard component followed by the soft component out of the injection cylinder into the mold cavity to extrusion coat the insert.

10 Claims, 1 Drawing Sheet

FIG. 1
FIG. 2
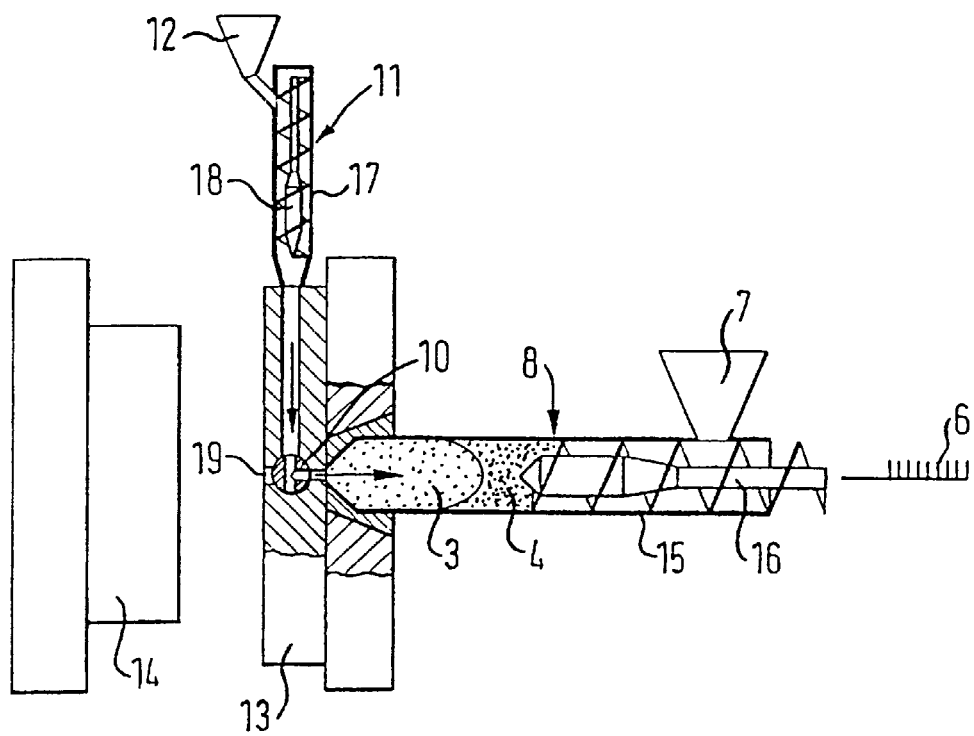
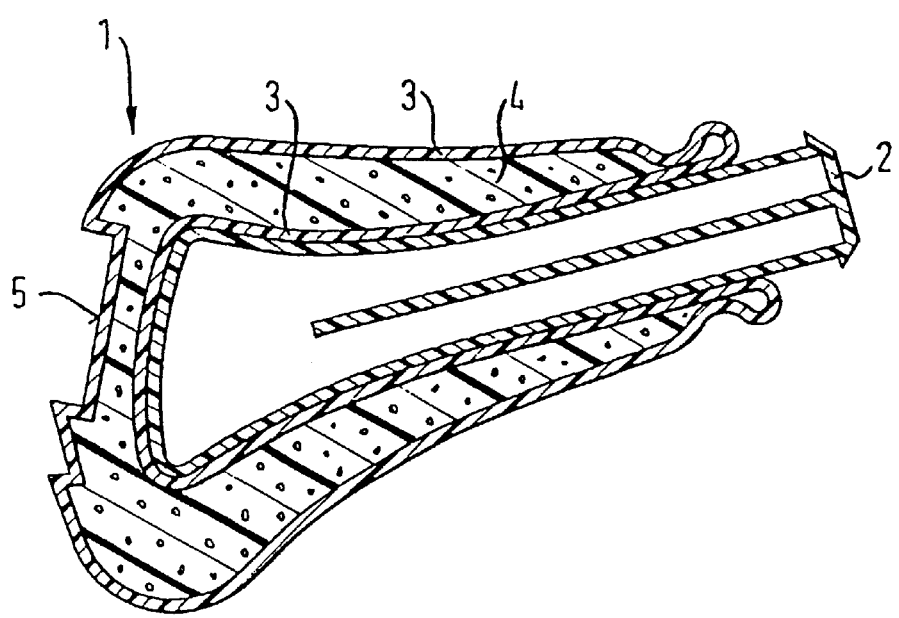

METHOD OF PRODUCING HIGH-GRADE PLASTIC PARTS AND AN INJECTION-MOULDED PART

This application is a continuation of International Application No. PCT/EP97/02581, filed May 21, 1997, the content of which is Incorporated herein by reference.

The present invention relates to a method of producing high-grade plastic parts and to an injection-molded part that is correspondingly produced.

In the case of high-grade plastic parts, particularly as regards the interior fixtures and fittings of motor vehicles, a major role is played by properties which relate to the feel when such parts are lightly touched or the feel when these parts are firmly seized with one's hands.

In this way, for example, it is already known that a molded core part produced by conventional injection molding and known as an "insert" in the case of certain plastic parts, should be foam-coated with a second component. Gearshift levers for motor vehicle transmissions can for example be produced using such a process. During foam coating with the second component, a layer is formed on the inner surface of the mold cavity; this layer results in a relatively hard skin that lends the plastic part a pleasant dry sensation. The relatively hard skin merges inwardly into a soft foam structure which results in a pleasant touch when firmly taken hold of with one's hands. The combination of dry sensation and soft touch produces a special feel which can at most be surpassed by the feel of a part trimmed with leather.

Plastic parts which are produced in this manner, i.e. based on the so-called "integral foam technique", and fitted with an insert, nevertheless require a relatively complex procedure and more or less intricate refinishing. Because this process tends to form voids, the number of rejects is also relatively high.

It is also already known that inserts should be extrusion-coated with a single plastic component. Because of its process reliability, this manner of extrusion-coating the insert is well suited to automatic production and also permits relatively short cycle times. Furthermore, plastic parts that are produced by extrusion-coating the insert do not require any refinishing whatsoever.

All the same, there is the disadvantage that depending on the component used to extrusion-coat the insert, only that feel which is characteristic of this component can be produced. If a hard component is for example used for the purpose of extrusion coating, a pleasant dry sensation is indeed obtained, but an unpleasantly hard touch is also produced when the article is firmly seized with one's hands. Yet if a soft component is used for extrusion coating, this does indeed result in a pleasant soft touch, but it also leads to an unpleasant rubber-like, sticky sensation. The special feel that can be achieved by foam-coating an insert in the aforementioned manner cannot, however, be obtained by extrusion-coating.

It is also known that plastic parts should be produced according to the so-called mono-sandwich process. In this injection-molding technique, two or more different melt components in a specific layering are fed into an injection cylinder and are then successively pressed by the injection cylinder into a mold cavity. The first component pressed into the mold cavity forms a skin on the mold cavity walls; the next component makes contact with this skin on the inside of the skin in order to form an intermediate layer.

The "mono-sandwich" technique was developed to enable high-grade plastic to be used as sparingly as possible and only at those locations at which the high-grade material is necessary for optical or other reasons. In this way, yogurt pots can for example be produced by using the mono-sandwich method; the inner and outer walls of such yogurt pots consist of high-grade plastic approved for receiving food, while the inner wall and core area comprises an airtight plastic material.

Plastic objects such as handles and the like can also be produced using the mono-sandwich method; to achieve the static properties necessary for their function, the core area of such objects consists of a hard plastic material, while their outer area comprises a soft plastic material.

The object of the present invention is to devise an innovative method with which the special feel that could previously be achieved only as a result of complicated foam-coating can also be produced by means of extrusion-coating an insert.

In accordance with the invention, this object is solved by an injection-molding process in which a layering of at least one hard component followed by at least one soft component of a plastic material is built up in the injection cylinder and then these components are successively fed in this order from the injection cylinder into the mold cavity for the purpose of extrusion-coating the insert.

The fact that this layering of hard and soft components is injected onto an insert, i.e. just one side of the insert is e.g. provided with the above order of layers of different components, should also be subsumed here by the term "extrusion-coating".

The invention is based on the idea that an insert is extrusion-coated using a mono-sandwich process, which was designed per se for completely different areas of application, such that a relatively hard skin is produced on the outside of the finished plastic part. At least one soft layer adjoins this hard skin in the direction of the insert. The aforementioned dry sensation with a soft touch, which could hitherto only be obtained by complicated foam-coating, is achieved as a result of the relatively hard outer skin on a relatively soft layer. The hard component also makes contact, in a thin layer, with the insert, thus achieving excellent adhesion with the insert, which is very tricky in the case of a soft component that produces the desired soft sensation.

The new method permits completely automatic production with short cycle times, and the plastic parts produced in this manner do not need to be at all refinished.

It is advantageous if what is used as a soft component is a plastic material which in its finished state exhibits a hardness of 7 to 40 Shore A, preferably 30 Shore A, and particularly 7–8 Shore A in order to achieve a very "soft" feel.

A plastic material which in the plastic part's finished state exhibits a hardness of 70 to 100 Shore A, preferably 90 Shore A, is particularly suitable as a hard component. The method according to the invention is in principle suitable for producing every kind of plastic part. This method is particularly advantageous, however, for plastic parts which are needed for motor vehicle interior fixtures and fittings and which come into contact with one's hands. Examples of such plastic parts are gearshift levers, handles, buttons, glove compartment lids and the like.

To explain the invention further and to understand it better, an exemplary embodiment will now be described and explained in more detail with reference to the enclosed drawings.

FIG. 1 shows a schematic representation of an injection-molding apparatus for performing the method according to the invention, and FIG. 2 shows a gearshift lever produced by means of the method according to the invention.

The injection-molding apparatus for performing the method according to the invention is schematically depicted in FIG. 1. This apparatus comprises a main injection unit 8 and an adjacent ancillary extruder 11. The main injection unit 8 essentially comprises a main hopper 7 and a heated screw cylinder 15 with an internally mounted screw 16. A path measurement system 6 with which the path covered by the screw 16 within the main cylinder 15 can be measured is also coupled to the main injection unit 8.

The ancillary extruder 11 has essentially the same structure as the main injection unit 8. This extruder 11 comprises an ancillary hopper 12 and a screw cylinder 17 with an internally mounted screw 18.

The supply channels of the main injection unit 8 and the ancillary extruder 11 can be connected together by means of a three-way valve 10. The three-way valve forms part of an intermediate plate 13. In the present case, it is advantageously designed as a positively controlled slide that is moved via a rocker arm. A nozzle channel 19 leads from the three-way valve 10 into a mold cavity 14.

The production of a gearshift lever 1 as shown for example in FIG. 2 will now be explained in further detail.

The e.g. injected insert 2 is fixed into the mold cavity 14. The supported granulated plastic material forming the harder component 3 of the gearshift lever 1 to be produced is supported within the ancillary hopper 12. The granulated plastic material which forms the softer component 4 is bunkered within the main hopper 7 of the main injection unit 8. The three-way valve 10 is switched such that the channel from the ancillary extruder 11 is connected to the injection cylinder of the main injection unit 8. The granulated material or powder supported within the ancillary hopper 12 is supplied to the h eating cylinder 17 of the ancillary extruder 11. The material is plasticized in the heating cylinder 17 and introduced through the three-way valve 10 into the nozzle region of the main injection unit 8 where it forms the harder component 3.

Inside the main injection unit 8, the softer component 4 is supplied to the heating cylinder 15 where it is plasticized. In this region of the main injection unit 8—viewed from the mold cavity in the direction of the main injection unit 8—the hard component 3 and the soft component 4 are therefore layered in this order.

The three-way valve 10 is then switched over such that the supply to the mold cavity 14 via the nozzle channel 19 is open and the ancillary extruder access is closed. Operating the screw 16 of the main injection unit 8 causes first the harder component 3 and then the softer component 4 to be injected in this order into the mold cavity 14. On the one hand, the harder component 3 makes contact with the insert 2 and is widened on the other hand by the trailing softer component 4, thus also forming an outer skin formed by the harder component 3. This means that a thicker layer of the softer component 4 is formed between the outer skin and the thin layer which makes direct contact with the insert 2 and which comprises the harder component 3. The outer contour formed by the harder component 3 is predetermined by the mold cavity 14. In this way, a recess 5 is also e.g. provided here in order to attach a badge.

In the case of a handle (not shown), this layering is applied just at one side of the insert, and not around the entire insert as in the previous instance.

What is claimed is:

1. A method of producing an injection-molded part in which an insert is disposed within a mold cavity and extrusion-coated with a plastic material fed via an injection cylinder, comprising layering at least one hard component and at least one soft component of a plastic material within said injection cylinder and then successively feeding said hard component followed by said soft component out of said injection cylinder into said mold cavity to extrusion-coat said insert.

2. A method according to claim 1, wherein first at least one soft component followed by at least one hard component of a plastic material are introduced into said injection cylinder and said components are then successively fed in reverse order out of said injection cylinder into said mold cavity to extrusion-coat said insert.

3. A method according to claim 1, wherein said hard component is introduced from an ancillary extruder into said injection cylinder and, looking in the direction of ejection, said soft component is added there behind in said injection cylinder.

4. A method according to claim 1, wherein a plastic material that exhibits a hardness of 7 to 40 Shore A in its finished state is used as the soft component.

5. A method according to claim 4, wherein said plastic material used as the soft component exhibits a hardness of 30 Shore A in its finished state.

6. A method according to claim 4, wherein said plastic material used as the soft component exhibits a hardness of 7–8 Shore A in its finished state.

7. A method according to claim 1, wherein a plastic material that exhibits a hardness of 70 to 100 Shore A in its finished state is used as the hard component.

8. A method according to claim 7, wherein said plastic material used as the hard component exhibits a hardness of 90 Shore in its finished state.

9. A method according to claim 1, wherein the plastic material for said hard component and said soft component is a TPE (thermoplastic elastomer) based on SEBS (styrene-ethylene-butadiene-styrene).

10. A method according to claim 1, wherein the plastic material for said hard component and said soft component is a TPU (thermoplastic urethane).

* * * * *